Figure 1:
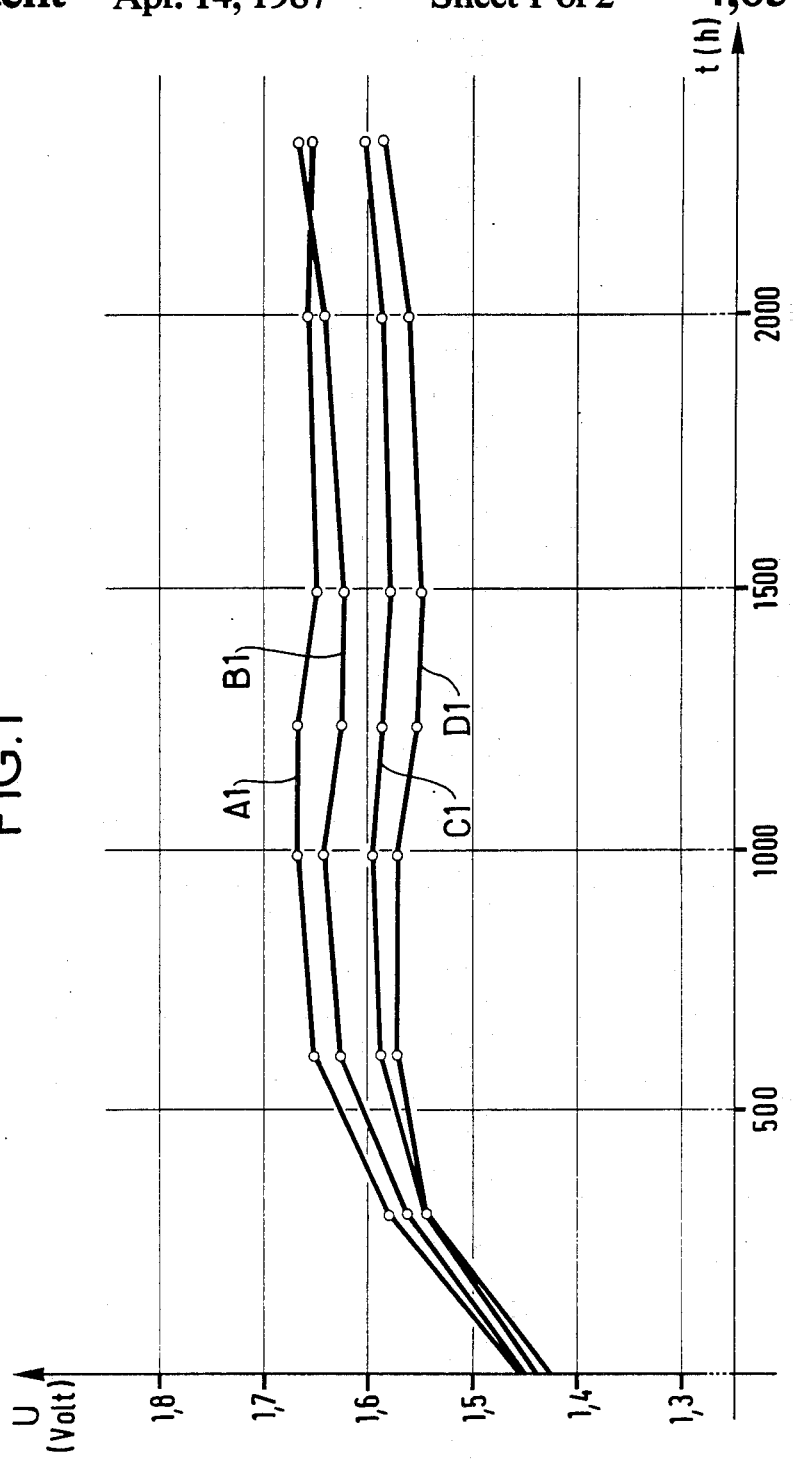

United States Patent [19]

Bouet

[11] Patent Number: 4,657,653
[45] Date of Patent: Apr. 14, 1987

[54] CATALYST FOR A BASIC SOLUTION ELECTROLYZER

[75] Inventor: Jacques Bouet, Paris, France

[73] Assignee: Alsthom-Atlantique, Paris, France

[21] Appl. No.: 738,715

[22] Filed: May 29, 1985

[30] Foreign Application Priority Data

May 29, 1984 [FR] France .................... 84 08428

[51] Int. Cl.⁴ .................. C25B 11/06; C25D 17/10; B05D 5/12
[52] U.S. Cl. .................. 204/290 R; 204/129; 427/126.3; 427/126.6; 502/101; 502/306
[58] Field of Search .................. 204/290 R, 290 F; 427/126.6, 126.3; 502/306, 101

[56] References Cited

U.S. PATENT DOCUMENTS

| 4,208,451 | 6/1980 | Appleby et al. | 427/126.6 |
| 4,354,915 | 10/1982 | Stachurski et al. | 204/290 R |
| 4,358,475 | 11/1982 | Brown et al. | 204/290 R |
| 4,414,064 | 11/1983 | Stachurski et al. | 204/290 R |

Primary Examiner—P. E. Konopka
Attorney, Agent, or Firm—Sughrue, Mion, Zinn, Macpeak & Seas

[57] ABSTRACT

A catalyst for an electrolyzer of basic solutions. An electrode catalyst for an electrolyzer of basic solutions, the catalyst consisting of a compound based on a mixed oxide of molybdenum and of nickel, characterized by the fact that the said compound is of the form $(Ni_{1-x}Cd_x)MoO_4$, where $0.02 \leq x \leq 0.06$.

3 Claims, 2 Drawing Figures

CATALYST FOR A BASIC SOLUTION ELECTROLYZER

The present invention relates to a catalyst for an electrolyzer of basic solutions, and in particular aqueous solutions, in which oxygen is evolved at the anode and hydrogen is evolved at the cathode.

French patent specification No. 2 418 281 describes a cathode for an electrolyzer based on sintered nickel containing a nickel molybdate. In order to make such a cathode, a sintered nickel support may be impregnated by a first immersion in ammonium molybdate; it is then heated in a non-reducing atmosphere to a temperature of about 450° C.; a second immersion is performed in a solution of a nickel nitrate salt, and it is heated to a temperature close to about 450° C.

It is also possible to perform both immersions simultaneously in an aqueous solution of ammonium molybdate and of nickel nitrate stabilized by ammonia.

It has been observed that the performance of such catalysts for a electrolyzing water in a hot basic medium at high current density degrades over time.

It has been discovered that his phenomenon is related to an increase in the oxygen overvoltage which appears to be due to a modification in the structure of the catalyst.

In particular, the nickel oxyhydroxide phase having a gamma crystallographic structure is formed together with molybdenum oxides in which the valence of the molybdenum exists with several values in the range $+III$ to $+VI$.

This "stoichiometric slip" of the catalyst appears not only under permanent operating conditions of the electrolyzer, but also during stop periods in which leakage currents may even give rise to polarity reversal. Indeed, when polarity reversal occurs, molybdenum oxide dissolution has been observed at the cathode (which molybdenum oxide is thus lost), together with modification of the state of the nickel oxide, both of which phenomena are irreversible.

The aim of the present invention is to provide a catalyst of the nickel molybdate type but having a structure which is more stable over time than that of known catalysts, i.e., which is less subjected to the phenomenon of stoichiometric slip, whether during normal operation of the electrolyzer or during periods in which the electrolyzer is stopped.

The present invention provides an electrode catalyst for an electrolyzer of basic solutions, the catalyst being constituted by a compound based on a mixed oxide of molybdenum and of nickel, characterized by the fact that the said compound is of the form $(Ni_{1-x}Cd_x)MoO_4$, where $0.02 \leq x \leq 0.06$.

For x greater than 0.06, i.e. for a weight ratio Cd/Ni+Cd greater than 10%, the catalyst segregates. For x less than 0.02, stoichiometric slip of the catalyst reappears.

Thus, incorporating cadmium in the catalyst when it is made directs the reaction towards the formation of nickel molybdate which is less subject to stoichiometric drift.

The present invention also provides a method of preparing a catalyst in accordance with the invention.

Such a method is characterized by the fact that the electrode support is impregnated with a solution containing ammonium paramolybdate, nickel nitrate, and cadmium nitrate stabilized by ammonia, in that it is roasted under air to a temperature lying between 400° C. and 550° C., in that partial reduction is performed under an atmosphere of nitrogen and hydrogen at a temperature lying between 400° C. and 550° C., and in that cooling is performed under a neutral atmosphere.

Nickel and cadmium nitrates may be replaced by nickel and cadmium sulfates.

According to another mode of preparation, the starting point is a solution of ammonium paramolybdate and salts of nickel and cadmium selected from nitrates and sulfates. The catalyst support is impregnated and precipitation is performed with soda to form the corresponding hydroxides. After drying, and washing in distilled water, the above-mentioned heat treatment is performed.

Figure 2:
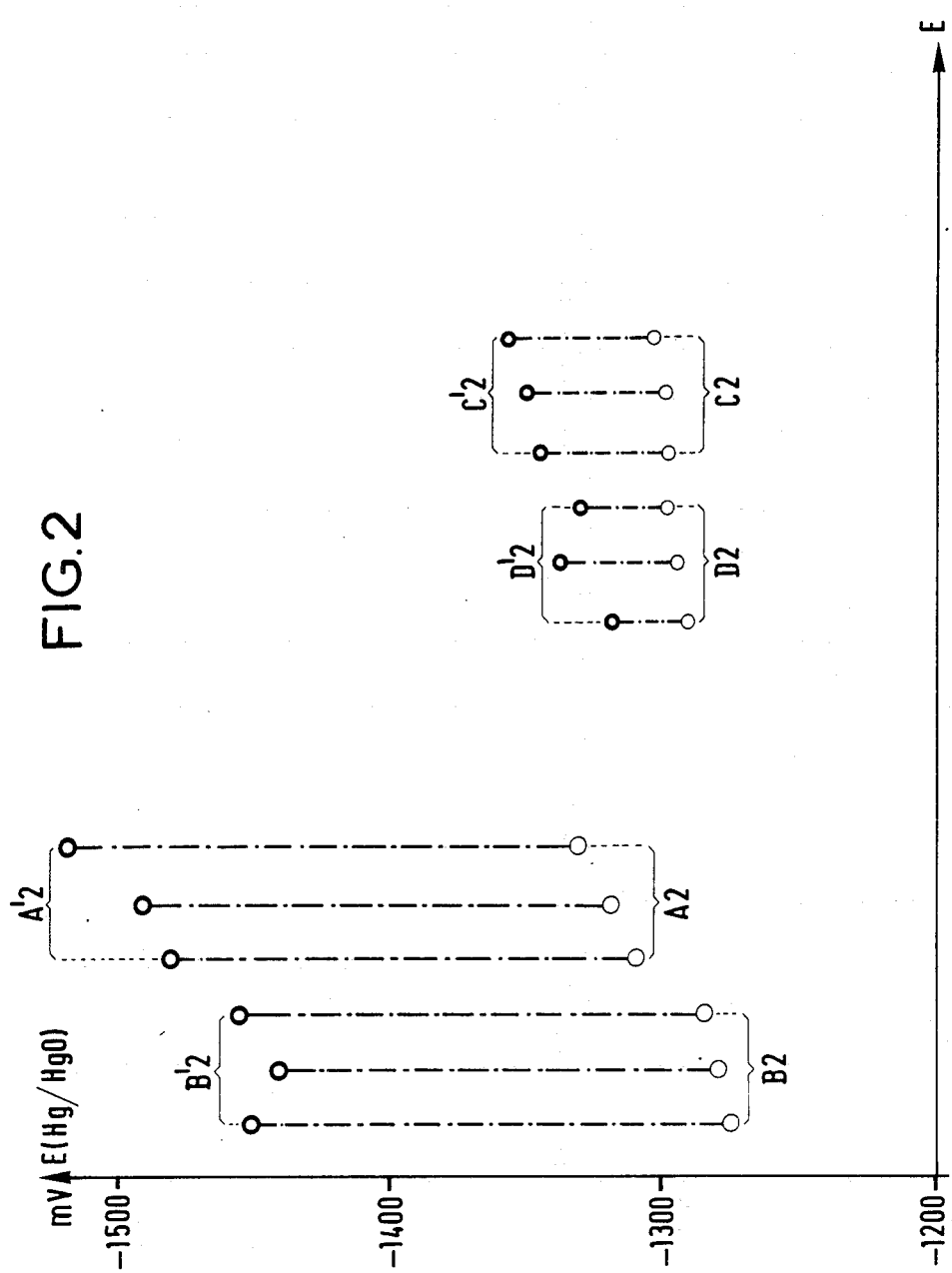

Other characteristics and advantages of the present invention appear from the following description of embodiments given by way of non-limiting illustration. In the accompanying drawings:

FIG. 1 shows the variation in electrolysis voltage U (volts) as a function of time t (hours) for prior art electrodes and for electrodes in accordance with the invention; and FIG. 2 shows the effect of electrolyzer polarity reversal on prior art cathodes and on cathodes in accordance with the invention; E designates the samples tested.

Four catalysts A, B, C, D are made on sintered nickel cathodes, A and B being prior art catalysts and C and D being in accordance with the invention.

The catalyst A is obtained by the two immersion method with two drying stages at 450° C. as mentioned above and in accordance with the teaching of French Pat. No. 2 418 281.

Catalyst B is obtained by the single immersion method with one drying stage at 450° C. as described likewise in said prior French patent.

Catalysts C and D in accordance with the invention are obtained in the following manner. An impregnating solution having the following composition is used:

Ammonium paramolybdate
$(NH_4)_6Mo_7O_{24}$, $4H_2O$    235.4 grams/liter (2 moles Mo/l)
Nickel nitrate
$(NiNO_3)_2$, $6H_2O$    581.6 grams/liter (2 moles Ni/l)
Cadmium nitrate
$Cd(NO_3)_2$, $4H_2O$    32 grams/liter which corresponds to a Cd/Ni percentage equal to 10% by weight.

After impregnating a sintered nickel support using said solution, it is roasted in air for one hour at 450° C. for catalyst C and 550° C. for catalyst D. It is then partially reduced in a nitrogen atmosphere with 10% hydrogen for one hour at 450° C. for catalyst C and at 550° C. for catalyst D. It is then cooled under a neutral atmosphere.

FIG. 1 shows the variation in the electrolysis voltage U as a function of time t when using the four catalysts A, B, C, D.

The electrolyte is a 10N aqueous solution of potash, the temperature is 80° C. and the current density is 1 $A/cm^2$.

The curve corresponding to the catalysts A, B, C, D are referenced $A_1$, $B_1$, $C_1$, $D_1$. It can thus be seen that the loss of activity under permanent operating conditions is less for catalysts in accordance with the invention.

Stabilization relative to nickel valency III due to the insertion of cadmium is at the origin of the stability of catalysts in accordance with the invention.

In order to study the behavior at reversal of cathodes provided with catalysts in accordance with the invention, groups of three samples of each type A, B, C, D are prepared and referenced $A_2$, $B_2$, $C_2$, and $D_2$. The polarization E (mvolts) of the cathodes obtained is measured relative to a reference electrode (Hg/HgO). The results are marked on FIG. 2.

The same measurements are performed after electrolyzer polarity reversal: $A_2$, $B_2$, $C_2$, $D_2$ become $A'_2$, $B'_2$, $C'_2$, $D'_2$. It can be seen that prior art cathodes ($A'_2$, $B'_2$) lose an average of about 200 mvolts, whereas cathodes in accordance with the invention ($C'_2$, $D'_2$) lose a voltage of only 50 mvolts.

The reversal performance of a catalyst in accordance with the invention when used as a cathode is thus considerably better than before.

Naturally the invention is not limited to the embodiments which have just been described.

Thus, for the method of fabricating a catalyst in accordance with the invention it is possible to act as follows. Starting from a solution of ammonium paramolybdate with salts of nickel and cadmium chosen from nitrates and sulfates, a sintered nickel support is impregnated and the corresponding hydroxides are precipitated using soda at 125 grams/liter. After drying at 60° C. for 15 hours and washing in distilled water, the previously described heat treatment is applied.

Other equivalent implementation conditions could be provided.

I claim:

1. An electrode catalyst for an electrolyzer of basic solutions comprising a mixed oxide represented by $(Ni_{1-x}Cd_x)MoO_4$ where $0.02 \leq X \leq 0.06$ prepared by impregnating an electrode support with a solution containing ammonium paramolybdate and nickel and cadmium salts selected from the group consisting of nitrates and sulfates, air roasting said impregnated support at a temperature of between 400° C. and 550° C., carrying out partial reduction of said impregnated and air roasted support under a nitrogen and hydrogen atmosphere at a temperature of between 400° C. and 550° C., and cooling under a neutral atmosphere.

2. The catalyst in accordance with claim 1, wherein said impregnation solution is stabilized with ammonia.

3. The catalyst in accordance with claim 1, wherein after said impregnation, precipitation is carried out with soda to form the corresponding hydroxides, and then the electrode catalyst is dried and washed prior to said air roasting.

* * * * *